3,007,895
STABILIZERS FOR POLYMERS
CONTAINING CHLORINE
Ernst Roos, Leverkusen, Friedrich Lober, Leverkusen-Bayerwerk, and Martin Burgdorf, Leverkusen, Germany, assignors to Farbenfabriken Bayer Aktiengesellschaft, Leverkusen, Germany, a corporation of Germany
No Drawing. Filed Aug. 14, 1959, Ser. No. 833,700
Claims priority, application Germany Aug. 19, 1958
11 Claims. (Cl. 260—45.8)

This invention relates to the stabilization of chlorine containing polymers.

It is known that polymers and copolymers containing chlorine, such as for example polymers of vinyl chloride and co-polymers of vinyl chloride and vinyl acetate, as well as polymers and co-polymers of vinylidene chloride, undergo undesired changes under the action of light and heat, these changes leading to discoloration, deterioration in the mechanical properties and to hydrochloric acid being split off. Consequently, it is necessary to add stabilizers to these high molecular compounds containing chlorine in order to improve their working properties and their properties in use.

It has now been found that 5-amino-tetrazole, the amino group of which can, if necessary, be acylated, or the salts thereof, are very suitable as stabilizers for polymers and co-polymers containing chlorine.

Examples of the acylated 5-amino-tetrazoles to be used according to the invention are 5-acetyl-amino-tetrazole (M.P. 269° C.), 5-benzoylamino-tetrazole (M.P. 274° C.) or 5-phenylureido-tetrazole (M.P. 254° C.). Examples of the salts are the alkali, alkaline earth, zinc, tin, cadmium or aluminum salts.

Polymers and co-polymers containing chlorine which are suitable for the process of the invention are, for example polymers of vinyl chloride or vinylidene chloride or co-polymers of these compounds or co-polymers of these compounds with vinyl acetate.

The stabilizers used according to the invention are employed in the usual manner by adding them to the polymer or co-polymer containing chlorine, for example by themselves, in admixture with one another and/or in admixture with other stabilizers, in amounts of 0.1 to 5% by weight, advantageously 0.3 to 2% by weight. The stabilizers can be added for example during polymerization, during the subsequent production of the mixture or on the roller.

The stabilizers used according to the invention are solid and odorless compounds and have good compatibility with the polymers or co-polymers containing chlorine and also the plasticizers which are generally employed and they produce a very good stabilization against heat and light. Furthermore, the compounds are physiologically unobjectionable, provided that any metal ions used are not toxic. Foils which are obtained from polymers stabilized with the previously mentioned compounds can consequently also be employed for packing foods.

The following examples further illustrate the invention without limiting it thereto.

EXAMPLE 1

100 parts by weight of a polyvinyl chloride produced by emulsion polymerization and having the K-value of 70 were mixed with the substances indicated under a–m on a roller heated to 160° C.

(a) 0.5 part by weight of 5-amino-tetrazole
(b) 1.0 part by weight of 5-amino-tetrazole
(c) 2.0 parts by weight of 5-amino-tetrazole
(d) 0.5 part by weight of the stannous salt of 5-amino-tetrazole
(e) 1.0 part by weight of the stannous salt of 5-amino-tetrazole
(f) 2.0 parts by weight of the stannous salt of 5-amino-tetrazole
(g) 1.0 part by weight of 5-phenylureido-tetrazole
(h) 0.5 part by weight of the stannic salt of 5-amino-tetrazole
(i) 1.0 part by weight of the stannic salt of 5-amino-tetrazole
(k) 2.0 parts by weight of 5-lauroylamide-tetrazole
(l) 3.0 parts by weight of 5-stearoylamide-tetrazole
(m) 1.0 part by weight of p-chlorobenzoylamido-tetrazole None of the samples showed any discoloration after being rolled for 25 minutes, whereas the unstabilized polyvinyl chloride under otherwise identical conditions already shows a brown discoloration after 5 minutes.

Specimens of the sheets obtained after rolling for 25 minutes were stored at 170° C. in a chamber heated by circulating hot air and examined for discoloration after 15, 30, 45, 60, 90 and 120 minutes. Specimens (a) to (m) showed a brown discoloration after the following times:

(a) 90 minutes          (g) 90 minutes
(b) 120 minutes         (h) 60 minutes
(c) more than 120 minutes (i) 120 minutes
(d) 60 minutes          (k) 90 minutes
(e) 120 minutes         (l) 90 minutes
(f) more than 120 minutes (m) 45 minutes Weathering Specimens of (b) and (c), after being rolled for 10 minutes, were exposed for 8 weeks during summer months to natural weathering conditions. They still show no discoloration after this period. Corresponding results were obtained by exposure to ultra-violet rays in a "Xenotest."

EXAMPLE 2

60 parts by weight of a polyvinyl chloride produced by emulsion polymerization and 40 parts by weight of a plasticizer (alkyl sulphonic acid ester of a phenol-cresol mixture) were rolled for 60 minutes at 160° C. with 0.18 part by weight of 5-amino-tetrazole and 0.3 part by weight of the stannous salt of 5-amino-tetrazole. No discoloration occurred. After storing these rolled specimens for several weeks, sweating-out of the stabilizers could not be observed. Similar results were produced by replacing the plasticizer mentioned above by 40 parts by weight of dioctyl phthalate.

EXAMPLE 3

100 parts by weight of a polyvinyl chloride produced by polymerization in suspension and having a K-value of 70 were mixed on a roller heated to 165° C. with 1 part by weight of the stannous salt of 5-amino-tetrazole. The rolled sheet still showed no discoloration after being rolled for 25 minutes. A specimen of the sheets obtained by rolling for 25 minutes was stored at 170° in a chamber heated by circulating hot air only showed a brownish discoloration after another 98 minutes.

The same result is obtained if the stannous salt of 5-amino-tetrazole is replaced by the following compounds:

(a) 1.0 part by weight of the sodium salt of 5-amino-tetrazole
(b) 2.0 parts by weight of a mixture of equal parts of the calcium salt and barium salt of 5-amino-tetrazole
(c) 1.0 part by weight of the potassium salt of 5-amino-tetrazole
(d) 1.0 part by weight of the cadmium salt of 5-amino-tetrazole (e) 1.0 part by weight of the zinc salt of 5-amino-tetrazole
(f) 3.0 parts by weight of 5-lauroylamido-tetrazole
(g) 1.0 part by weight of the calcium salt of 5-amino-tetrazole
(h) 1.0 part by weight of the barium salt of 5-amino-tetrazole The discoloration in the heated chamber occurred after the following periods of time:

(a) 90 minutes        (e) 30 minutes
(b) 120 minutes       (f) 45 minutes
(c) 60 minutes        (g) 60 minutes
(d) 60 minutes        (h) more than 90 minutes

EXAMPLE 4

100 parts by weight of a co-polymer of vinyl chloride and vinyl acetate with a vinyl acetate proportion of 3% and a K-value of about 68 are mixed for 25 minutes on a roller heated to 160° C. with the substances indicated under (a) to (c).

(a) 1.0 part by weight of 5-amino-tetrazole
(b) 1.0 part by weight of the sodium salt of 5-amino-tetrazole
(c) 1.0 part by weight of the stannous salt of 5-amino-tetrazole None of the specimens showed any discoloration after being rolled for 25 minutes, whereas the unstabilized co-polymer, under otherwise the same conditions, already showed a brown discoloration after 5 minutes.

Specimens of the sheets obtained after rolling for 25 minutes were stored at 170° C. in a chamber heated by circulating hot air and the discoloration thereof was investigated after 15, 30, 45, 60 and 90 minutes. Specimens (a) to (c) showed a brown discoloration after the following times:

(a) 15 minutes
(b) 30 minutes
(c) 90 minutes

EXAMPLE 5

100 parts by weight of a polymer of vinylidene chloride were mixed with 1 part by weight of the sodium salt of 5-amino-tetrazole on a roller heated to 155° C. Whereas the pure polymer already shows a dark discoloration after 10 minutes, the mixture still showed no burning phenomena, even after 20 minutes.

We claim:

1. A process for stabilizing polymers selected from the group consisting of polyvinyl chloride, polyvinylidene chloride, a vinyl chloride/vinyl acetate copolymer, and a vinylidene chloride/vinyl acetate copolymer which comprises using as stabilizing agent a member selected from the group consisting of 5-amino-tetrazole, 5-acylamino-tetrazoles, and salts of 5-amino-tetrazole.

2. A process for stabilizing polymers selected from the group consisting of polyvinyl chloride, polyvinylidene chloride, a vinyl chloride/vinyl acetate copolymer, and a vinylidene chloride/vinyl acetate copolymer which comprises using as stabilizing agent 5-amino-tetrazole.

3. A process for stabilizing polymers selected from the group consisting of polyvinyl chloride, polyvinylidene chloride, a vinyl chloride/vinyl acetate copolymer, and a vinylidene chloride/vinyl acetate copolymer which comprises using as stabilizing agent the sodium salt of 5-amino-tetrazole.

4. A process for stabilizing polymers selected from the group consisting of polyvinyl chloride, polyvinylidene chloride, a vinyl chloride/vinyl acetate copolymer, and a vinylidene chloride/vinyl acetate copolymer which comprises using as stabilizing agent the calcium salt of 5-amino-tetrazole.

5. A process for stabilizing a polymer selected from the group consisting of polyvinyl chloride, polyvinylidene chloride, a vinyl chloride/vinyl acetate copolymer, and a vinylidene chloride/vinyl acetate copolymer which comprises using as stabilizing agent a member selected from the group consisting of 5-amino-tetrazole, 5-acylamino-tetrazoles and salts of 5-amino-tetrazoles.

6. Polymers selected from the group consisting of polyvinyl chloride, polyvinylidene chloride, a vinyl chloride/vinyl acetate copolymer, and a vinylidene chloride/vinyl acetate copolymer stabilized with a member selected from the group consisting of 5-amino-tetrazole, 5-acylamino-tetrazoles, and salts of 5-amino-tetrazole.

7. Polymers selected from the group consisting of polyvinyl chloride, polyvinylidene chloride, a vinyl chloride/vinyl acetate copolymer, and a vinylidene chloride/vinyl acetate copolymer stabilized with 5-amino-tetrazole.

8. Polymers selected from the group consisting of polyvinyl chloride, polyvinylidene chloride, a vinyl chloride/vinyl acetate copolymer, and a vinylidene chloride/vinyl acetate copolymer stabilized with the sodium salt of 5-amino-tetrazole.

9. Polyvinyl chloride stabilized with 5-amino-tetrazole.

10. Polyvinyl chloride stabilized with the sodium salt of 5-amino-tetrazole.

11. Polyvinyl chloride stabilized with the calcium salt of 5-amino-tetrazole.

References Cited in the file of this patent

UNITED STATES PATENTS 2,895,941        Montgomery et al. _____ July 21, 1959

OTHER REFERENCES

Herbst et al.: "Journal Organic Chemistry," January 1951, pages 139 and 146–149.